Figure 1:
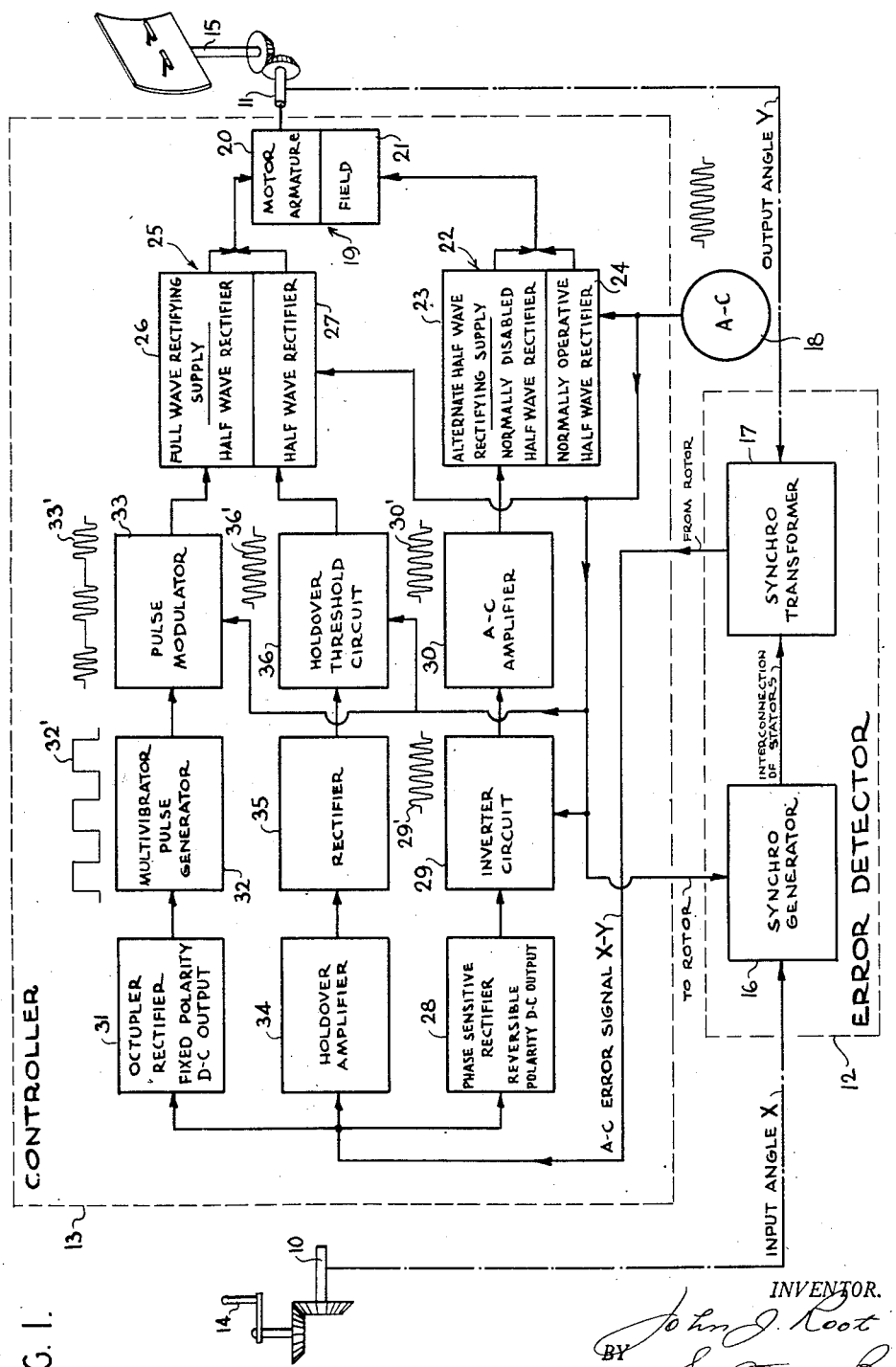

Jan. 30, 1951     J. J. ROOT     2,539,525
SERVO MECHANISM
Filed July 3, 1948     3 Sheets-Sheet 3
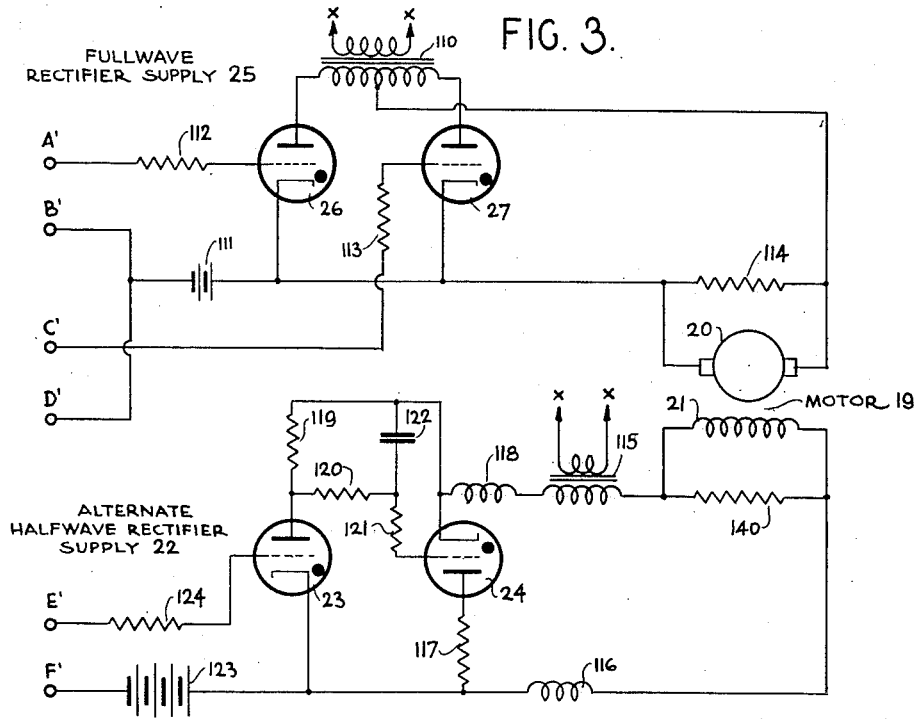
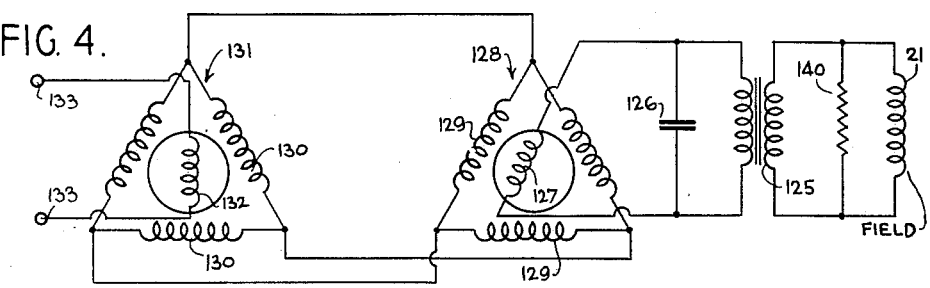
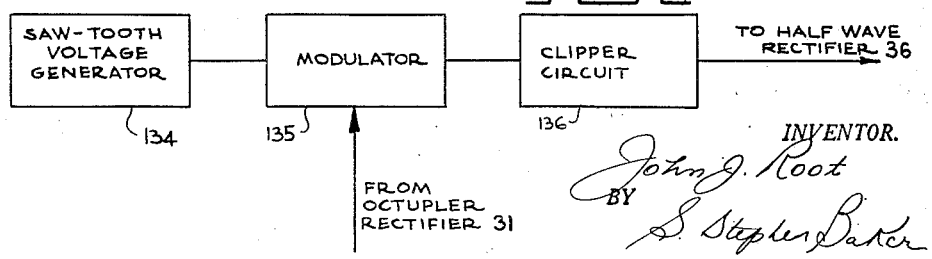
INVENTOR.
John J. Root
BY S. Stephen Baker
ATTORNEY.

Patented Jan. 30, 1951

2,539,525

UNITED STATES PATENT OFFICE 2,539,525

SERVO MECHANISM

John J. Root, New York, N. Y.

Application July 3, 1948, Serial No. 36,900

14 Claims. (Cl. 318—30)

The present invention relates generally to servo mechanisms adapted to rotate an output shaft in correspondence with an arbitrary motion of an input shaft, and more particularly to an improved electronic controller in a servo mechanism for applying torque to the output shaft in a direction tending to correct a discrepancy existing between the angular positions of the input and output shafts.

Servo mechanisms find application where the arbitrary motion imparted to one shaft must be reproduced accurately with torque amplification by the motion of a second haft. Although the instant invention will be described in connection with the remote control of a rotary antenna mount in a radar system, it is to be understood that the invention may be employed with like advantage in any control arrangement entailing a servo mechanism, as for example, in the pointing of searchlights and for the operation of steering devices in aircraft.

In the event the input shaft of a servo mechanism is turned abruptly to a new position, the output shaft will often oscillate several times about its new position before coming to rest. As the coupling between the handwheel for controlling the antenna position and the antenna mount itself is effectively somewhat elastic by reason of the electrical and magnetic circuits involved in the servo system, the inertia of the moving antenna mount causes it to overshoot its required position. An error voltage is developed in the servo system in the opposite direction so that overshooting recurs. Successive overshooting, or hunting as it is commonly referred to, is obviated in a conventional servo mechanism by means of an anti-hunt device which may take the form of mechanical friction means or electrical feedback circuits adapted to reduce the speed of the motor as it approaches the desired position, whereby the antenna mount coasts into position without overshooting.

Inasmuch as anti-hunt devices heretofore known act to reduce the gain or peak power developed in the servo system, their use is attended by certain drawbacks. The greater the gain of the controller in the servo system supplying torque amplification, the greater is the tendency of the system to hunt. However, the highest possible gain is always desirable in view of the fact that high gain improves the response characteristic of the system and minimizes errors arising from load torques, the normal mechanical friction of the system, and other effects. Consequently where the elimination of hunting is accompanied by a loss of gain, this effect constitutes a serious disadvantage, particularly in connection with low power servo installations.

In view of the foregoing, it is the principal object of this invention to provide an improved servo system free from hunting effects and characterized by a high order of accuracy.

More particularly, it is the object of this invention to eliminate hunting in a servo system without an attendant loss in power and without the use of an auxiliary anti-hunt device.

Another object of this invention is to provide a servo system including a standard direct-current motor wherein a high level of torque is attained at slow speeds as well as at fast speeds.

Still another object of this invention is to provide a servo mechanism adapted for the control of a radar antenna mount, whereby either continuous or sector scanning operation may be brought about without auxiliary apparatus.

Yet another object of this invention is to provide a multivibrator arrangement in a servo system wherein the repetition rate of the pulses generated by the multivibrator may be controlled in accordance with the magnitude of a direct voltage.

Briefly stated, the above listed objects are realized in one preferred embodiment of a servo system in accordance with the principles underlying the invention wherein the electric motor driving the output shaft coupled to the load is continuously energized only when the angular displacement between the output and input shafts exceeds a predetermined value to cause the motor to rotate at its maximum speed. But when by the action of the motor the displacement is made less than the predetermined value, the motor is then intermittently energized by successive power pulses. The arrangement is such that the rate of pulsing progressively diminishes as the angular displacement decreases so that the motor speed gradually lessens until the desired position is exactly reached, at which point the pulse rate is zero and the motor comes to a halt. The fact that the time at which continuous power is applied and the time when pulsing at a variable rate commences is adjustable at will, makes it possible to preset the servo system to the critically damped state and prevents overshooting or undershooting of the precise position of alignment.

In the course of pulsing, the amplitude of the pulses remains constant while the spacing between pulses varies in accordance with the angular displacement. Consequently the momentary torque developed by the motor during the existence of a pulse is independent of the angular displacement, whereas the speed of the motor depends on the angular displacement, the smaller the displacement the slower the speed. It will therefore be evident that no lessening in motor response arises in the condition where the angular displacement is of slight value so that the motor is capable of bringing about an exact alignment of the input and output shafts. In other words, below the predetermined value of angular displacement the average power supplied to the motor varies as a function of the angular displacement, whereas the peak power supplied to the motor is maintained constant.

For a better understanding of the invention, as well as other objects and further features thereof, reference is made to the following detailed description of the invention to be read in connection with the accompanying drawings wherein like elements in the several figures are designated by like numerals.

Figure 2:
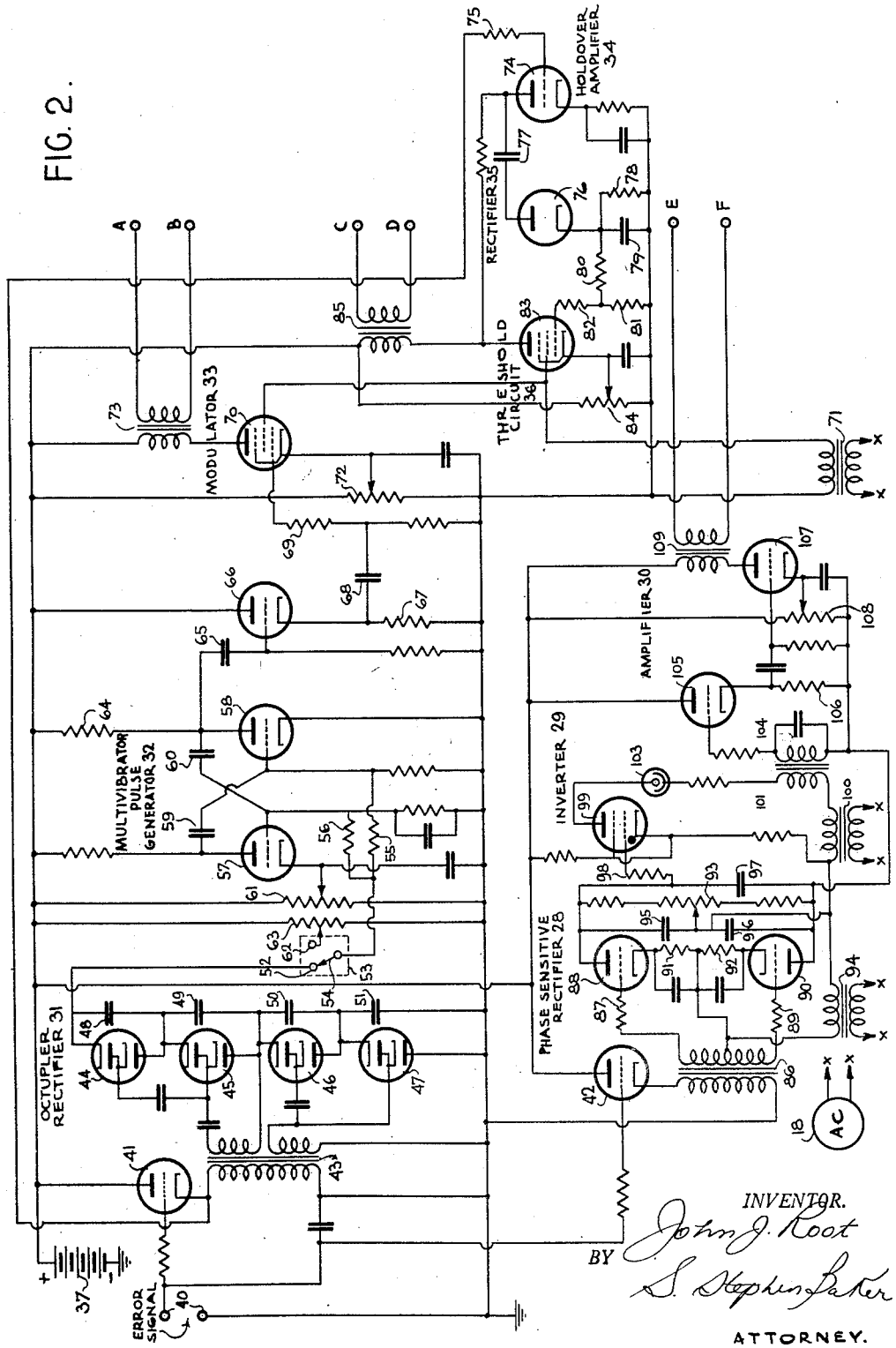

In the drawings:

Figure 1 is a simplified block diagram of a preferred embodiment of a servo system in accordance with the invention, Figure 2 is a schematic circuit diagram of a section of the system disclosed in Figure 1, Figure 3 is a schematic circuit diagram of another section of the system disclosed in Figure 1, Figure 4 is a schematic circuit diagram of a modification of the arrangement shown in Fig. 1, and Figure 5 is a block diagram of another modification of the arrangement of Fig. 1.

Referring now to Figure 1, the fundamental components of a servo system in accordance with the invention are an input shaft 10, an output shaft 11, an error detector 12 adapted to measure the difference between the input angle $x$ and the output angle $y$, and a controller 13 incorporating a drive means for governing the motion of the output shaft as a function of the magnitude and direction of error angle $(x-y)$ and power means to energize said drive means.

Input shaft 10 is geared to a handwheel 14 by means of which a remote control operator may adjust the input shaft to a desired angular position. Output shaft 11 is geared to an antenna mount 15 which is rotated by the drive means of controller 13 to a position in alignment with input shaft 10.

Error detector 12 is of conventional design and is constituted by a synchro generator 16 and a synchro control transformer 17, the stator windings of the transformer and generator being interconnected in the usual manner. The rotor of synchro generator 16 is mechanically coupled for rotation with input shaft 10, while the rotor of synchro transformer 17 is mechanically coupled for rotation with output shaft 11. The rotor of generator 16 is energized by an alternating-current line voltage derived from a source 18. Derived from the rotor of transformer 17 is an alternating-current error signal whose amplitude varies in accordance with the degree of error angle $(x-y)$ and whose phase is either in coincidence or in opposition with the voltage of source 18 depending on the direction of the error angle, the phase reversing as the direction reverses.

Controller 13 includes a direct-current motor 19 having an armature 20 and a field winding 21, the shaft of the motor being mechanically connected to output shaft 11. Field 21 is energized by means of a rectifying power supply 22 formed by two alternately operating, grid-controlled, half-wave rectifier devices 23 and 24 which are arranged in parallel opposition with respect to an alternating-current path from source 18. Rectifier device 23 is biased so as to be normally disabled, whereas rectifier device 24 is arranged to be normally operative to thereby supply a direct-current to field 21 with a polarity causing the motor to turn in one direction. When, by means hereinafter to be described, an uninterrupted, alternating-current exciter voltage is applied to the grid of rectifier device 23, said device is rendered operative while device 24 is simultaneously disabled by the direct voltage developed by device 23. The direct voltage developed by rectifier device 23 is also impressed on field 21 but with a polarity which is in opposition to that yielded by device 24, whereby the motor 19 reverses in direction. The magnitude of the direct voltage developed by device 23 is equal to that of device 24 although of opposite polarity; hence the resultant field strength in motor 20 is the same regardless of which device is operative. It will be noted that at no time is the field 21 deenergized.

Armature 20 is energized by means of a full-wave, rectifying power supply 25 including a pair of half-wave, grid-controlled rectifier devices 26 and 27, both of which are normally biased to cut-off. When the angular displacement between input and output shafts 10 and 11 exceeds a predetermined value, which may be selected at will, applied solely to the grid of rectifier device 25 is an uninterrupted, alternating-current exciter voltage which renders said device conductive, thereby causing a direct voltage to be applied to the armature. At the same time there is applied to the grid of rectifier device 24 an alternating-current, exciter voltage which is periodically interrupted at a variable rate, thereby rendering said device conductive only during the existence of exciter voltage pulses at the grid thereof.

When, however, the angular displacement falls below the predetermined value, the uninterrupted exciter voltage is removed from rectifier device 27 so that this device is rendered inoperative. However, exciter voltage pulses continue to be injected on the grid of rectifier device 26, the periodicity of said control pulses decreasing progressively as the angular displacement is reduced. When the position of output shaft 11 corresponds with input shaft 10, the periodicity of control pulses applied to device 26 falls to zero and motor 20 comes to rest.

Thus the peak power impressed on armature 20 is greatest when the angular displacement exceeds the predetermined value since then both half-wave sections of rectifying supply 25 are conductive to provide full-wave rectification. When the displacement falls below the predetermined value only one half-wave section, namely device 26, remains operative, hence the peak power is abruptly diminished. Since device 26 is activated periodically and inasmuch as the rate of pulsing diminishes in accordance with the decrease in angular displacement, the average power is progressively reduced until the desired exact position is reached, although the level of peak power remains constant throughout the angular displacement range from zero to the predetermined value.

The manner in which the various alternating-current exciter voltages for actuating power supplies 22 and 25 are derived as a function of the error signal will now be explained: The error signal from the rotor of synchro control transformer 17 is fed to a phase-sensitive rectifier 28 which produces a direct-voltage whose polarity reverses when the phase of the control transformer error voltage reverses. That is, phase sensitive rectifier 28 in effect converts the alternating-current error signal of reversible phase into a direct-current error signal of reversible polarity.

The direct-current error signal is applied as a control voltage to an inverter circuit 29 which is arranged to produce an alternating-current output, as shown by pattern 29', in the event the polarity of the applied direct-current error signal is in a given sense and to be rendered inoperative when the polarity is in the opposite sense. The alternating-current yielded by inverter circuit 29 is passed through an A.-C. amplifier 30 to the control grid of rectifier device 23 in power supply 22. The arrangement is such that when the angular displacement is in one direction of deviation the inverter circuit 29 is rendered operative, thereby effecting the operation of rectifier device 23 to energize field 21 and causing motor 19 to turn in one direction. Should the angular displacement thereafter reverse direction, inverter circuit 29 is rendered inoperative, thereby cutting off rectifier device 23 and effecting the operation of rectifier device 24 to energized field 21. This causes motor 19 to turn in the opposite direction. In this manner the direction of motor rotation is controlled in accordance with the phase of the error signal.

In order to vary the average power applied to motor 20, the error signal from synchro transformer 17 is also fed to an octupler rectifier 31 which is adapted to produce a uni-polarity potential whose magnitude is proportional to the amplitude of the error signal but whose polarity is independent of the phase thereof. The uni-polarity potential is impressed on a multivibrator 32 adapted to generate periodic, rectangular-shaped voltage pulses of constant width, as shown by pattern 32', whose repetition rate depends on the magnitude of the applied uni-polarity potential. Thus the periodicity of the output pulses of multivibrator 32 varies in accordance with the amplitude of the error signal irrespective of its phase.

The pulses from multivibrator 32 are combined in a pulse modulator 33 with an alternating voltage taken from source 18 so that established in the output of modulator 33 are, as shown by pattern 33', successive pulses of alternating-current having a repetition rate depending solely on the amplitude of the error signal. These alternating-current pulses are applied as an exciter voltage to half-wave rectifier device 26 and serve to render said device conductive for the duration of the pulses. It will be apparent that in the absence of an error signal no alternating voltage pulses will be applied to rectifier device 26.

In order to raise the peak power supplied to motor 19 when the angular displacement exceeds a predetermined value to thereby increase the speed of the motor so as to correct rapidly for the displacement, the error signal is fed to a holdover system comprising an amplifier 34, a rectifier 35 and a threshold circuit 36. Amplifier 34 magnifies the error signal while rectifier 35 acts to rectify the amplified signal to produce a uni-polarity, direct-current potential whose magnitude is proportional thereto. The uni-polarity potential is imposed on threshold circuit 36 which is normally disabled. When the uni-polarity potential exceeds the threshold limit of circuit 36, an alternating voltage derived from source 18 is transmitted as an exciter voltage to the grid of rectifier device 27 to render said device conductive. Thus during the periods when half-wave rectifier device 26 is operative, power supply 25 behaves as a full-wave rectifier since at that time half-wave rectifier device 27 is also operative. The threshold limit of circuit 36 is set so that full-wave operation is obtained only in the condition where the angular displacement exceeds the predetermined value. Consequently controller 13 develops maximum peak power in this condition. When the displacement drops below the predetermined value as represented by the amplitude of the error signal, power supply 25 acts as a half-wave rectifier to bring about a reduction in the peak power. Obviously, in the absence of an error signal, neither the pulse system nor the holdover system is actuated.

When the speed of motor 19 is controlled solely by the pulses of varying periodicity during the time in which the angular displacement is less than the predetermined value, the momentary torque developed by the motor in response to an applied pulse is substantially constant in that the magnitude of the individual pulses applied to armature 20 is unvarying and the voltage applied to field 21 is constant. However since the pulses are intermittently applied, the torque is intermittently developed, hence the resultant motor speed depends on the frequency of pulsing. Thus, in contradistinction to conventional systems, a reduction in motor speed is attained without any reduction in motor torque. In other words, the peak power impressed on motor 19 is substantially constant, but the average power over a given period varies as the angular displacement.

Referring now to Figures 2 and 3, the controller 13 of the servo system is schematically illustrated, Figure 3 showing the arrangement of motor 19 in cooperation with power supplies 22 and 25, and Figure 2 showing the various elements for actuating the power supplies in accordance with the error signal. The stages in Figs. 2 and 3 which correspond with the elements in Fig. 1 are designated by like numerals. For simplicity, tube filaments and connections therefor have been omitted in the figures.

In Figure 2, direct-current for the controller is supplied by a battery source 37, while alternating-current is furnished by line source 18. The error signal set up in the output of the synchro control transformer 17 of error detector 12 in Fig. 1, is fed to the controller at input terminals 40 which are connected to the grid circuit of a first, cathode-follower amplifier including a triode 41, and also to the grid circuit of a second, cathode-follower amplifier including a triode 42. Interposed in the cathode circuit of triode 41 is the primary winding of a voltage step-up transformer 43, having a pair of secondary windings. The secondary windings are coupled to an octupler rectifying system 31 including four duo-diodes 44 to 47 whose electrodes are serially connected, the anode of each diode being connected to the cathode of the succeeding diode. Shunted across the serially connected duo-diodes 44 to 47 are four serially connected filter capacitors 48 to 51, the junctions of the capacitors being connected to the corresponding junctions of the duo-diodes. The output potential developed by octupler rectifier 31 is applied to a fixed contact 52 of a selector switch 53.

Octupler rectifier 31 furnishes a uni-polarity potential which is unaffected by the phase of the error signal but whose magnitude depends on the amplitude thereof. This characteristic is achieved by selecting filter condensers of relatively low value to insure poor rectifier regulation whereby the output potential is determined by the amplitude of the alternating-current error signal applied thereto. Octupling action serves to provide an appreciable output potential even for low levels of error signal, thus improving the sensitivity of the system. It is to be understood, however, that if preferred a direct-current amplifier in conjunction with a conventional rectifier may be substituted for octupler rectifier 31. But in this case precautions must be taken to ensure a zero output in the absence of an error signal input, otherwise undesired energization of the motor will occur at the point of zero angular displacement.

In the case where the adjustable contact 54 of switch 53 engages contact 52, the uni-polarity potential from rectifier 31 is applied through resistors 55 and 56 to the respective grids of a pair of triodes 57 and 58. Triodes 57 and 58 are arranged to form multivibrator circuit 32, the grid of each tube being coupled to the plate of the other tube by way of condensers 59 and 60. Multivibrator 32 is normally cut-off by means of a positive bias imposed on the cathode of triode 57, said bias being drawn from the variable tap of a potentiometer 61 which is shunted across source 37. The tap is adjusted so that the multivibrator ceases to be free running just at the point of zero direct-current input. The width of the pulses developed by multivibrator 32 is controlled by the capacitative ratio of condensers 59 and 60. This width is adjusted so as to supply power in one pulse to operate motor 19 efficiently. The characteristics of multivibrator 32 are such that an increase in the potential applied to the grids of triodes 57 and 58 will increase the repetition rate of the generated pulses, the change in rate being a linear function of the control potential derived from octupler rectifier 31.

For fixed pulse rate operation of the servo system for the purpose of continuous rotation of the antenna mount, a constant direct-current potential is introduced into multivibrator 31, and octupler rectifier 31 is disconnected. This operation is effected by shifting adjustable contact 54 of switch 53 to engage a fixed contact 62 which is connected to the variable tap of a potentiometer 63 shunted across direct-current source 37. The speed of continuous rotation may be controlled by changing the fixed voltage input to multivibrator 32.

The voltage pulses developed across plate resistor 64 of multivibrator 32 are impressed through coupling condenser 65 on the grid of a triode 66 arranged to operate as a cathode-follower amplifier. The voltage pulses appearing across cathode resistor 67 of the cathode-follower are applied through coupling condenser 68 and resistor 69 to the control grid of a pentode 70 in pulse modulator 33. Applied to the screen grid of pentode 70 is an alternating voltage derived from the secondary winding of a transformer 71 whose primary is connected to alternating-current source 18. Pentode 70 is biased to cut-off by means of a fixed voltage taken from the tap of a potentiometer 72 shunted across source 37 and applied to the cathode. Pentode 70 is rendered conductive by the input pulses applied to the control grid thereof and during its conduction period the anode current is modulated by the alternating voltage applied to the screen grid. Interposed between the anode of pentode 70 and the positive terminal of source 37 is the primary winding of an output transformer 73, the secondary winding being connected to output terminals A and B. Thus developed at terminals A and B are periodic pulses of alternating voltage, the periodicity thereof varying in accordance with the amplitude of the error signal applied to terminals 40.

The error signal output of cathode-follower triode 41 is also applied to the control grid of triode 74 in holdover amplifier 34 by means of a connection extending from the cathode of triode 41 through resistor 75 to the control grid of triode 74. The output of holdover amplifier 34 is applied to rectifier 35, including a diode 76, by way of condenser 77 interconnecting the anodes of diode 76 and triode 74. The rectified holdover voltage is developed across resistor 78 in the cathode circuit of diode 76, said voltage being filtered by means of capacitor 79 and series connected resistors 80 and 81 shunted across the capacitor. The filtered holdover voltage is impressed through resistor 82 on the control grid of a pentode 83 in threshold circuit 36. Impressed on the screen grid of pentode 83 is an alternating voltage from the secondary of transformer 71. The threshold limit of circuit 36 is determined by the magnitude of bias applied to the cathode of tube 83 from the variable tap on a potentiometer 84 shunted across circuit voltage source 37. When the holdover voltage applied to the control grid of tube 83 exceeds the threshold limit the tube is rendered conductive and an alternating-current component is developed in the anode circuit which is fed through a transformer 85 to output terminals C and D. Potentiometer 84 is set so that threshold circuit 36 is rendered operative at the amplitude of error signal corresponding to the predetermined value of angular displacement. Thus when the angular displacement exceeds the predetermined value, an alternating voltage appears across terminals C and D. Rectifier 35 is designed to be well regulated so that the alternating voltage at terminals C and D is substantially independent of the varying amplitude of the error signal above the predetermined value of angular displacement.

The error signal applied to cathode-follower triode 42 appears in the primary winding of a transformer 86 in phase sensitive rectifier 28, said primary being interposed in the cathode circuit of tube 42. Transformer 86 is provided with a center tapped secondary winding one end of which is connected through a resistor 87 to the grid of a triode 88 and the other end of which is connected through a resistor 89 to the grid of a triode 90. The center tap in the secondary of transformer 86 is connected through resistors 91 and 92 respectively to the cathodes of tubes 88 and 90. Interconnecting the anodes of tubes 88 and 90 is a potentiometer 93. Connected between the center tap in the secondary of transformer 86 and the variable tap of potentiometer 93 is the secondary of a transformer 94 whose primary is connected to alternating-current source 18. Connected respectively between the tap on potentiometer 93 and the anodes of tubes 88 and 90 are condensers 95 and 96. A filter condenser 97 is connected in parallel with potentiometer 93.

It will be evident that the reversible phase alternating-current error signal is applied to the grids of tubes 88 and 90 in push-pull relation, whereas the alternating-current from source 18 is fed thereto in parallel relation so that at any one time the latter current will be in phase opposition with the former current at the grid of one tube and in coincidence at the grid of the other tube. Therefore for a given phase of error signal only a single tube will conduct to provide a direct-current output voltage across potentiometer 93 in one polarity. Should the error signal reverse in phase, then the other tube will be rendered conductive to provide an output voltage of the opposite polarity. Thus the phase rectifier 28 produces a direct voltage whose polarity depends on the phase of the reversible phase error signal.

The reversible polarity voltage of phase sensitive rectifier 28 is applied through resistor 98 to the control grid of a gaseous discharge tube 99 of the screen grid, thyrator type in inverter circuit 29. An alternating voltage derived through transformer 100 from source 18 is applied to the anode of discharge tube 99 through the primary winding of an output transformer 101 in series with a resistor 102 and a glow discharge, regulating tube 103.

When the voltage impressed on the control grid of discharge tube 99 is of positive polarity the tube is ignited and an alternating-current passes through the primary of transformer 101. Since the primary of transformer 101 presents an inductive load to discharge tube 99, a condenser 104 is placed across the secondary thereof to correct for distortion in the sinusoidal shape of the alternating-current. Should the polarity of voltage impressed on the control grid of tube 99 reverse, then the tube is immediately extinguished and no alternating-current appears in the output of transformer 101. Glow discharge tube 103 acts to facilitate rapid extinguishment of the gaseous discharge tube upon the application of a negative voltage to the control grid.

Thus an alternating voltage is produced by inverter 29 when the error signal is in one phase but no output is produced when the error signal reverses in phase. This alternating voltage is applied to the grid of a triode 105 in amplifier 30, triode 105 being arranged as a cathode-follower. The alternating voltage appearing across the cathode resistor 106 of triode 105 is impressed on the grid of a triode 107 in a second amplifying stage whose gain is controlled by a bias voltage on the cathode taken from the tap in a potentiometer 108 shunted across source 37. The output voltage of triode 107 flows through the primary of an output transformer 109 whose secondary is connected to terminals E and F.

In summary, alternating voltage pulses of varying periodicity appear at output terminals A and B when an angular displacement exists between the input and output shafts, an uninterrupted alternating voltage appears across terminals C and D when the angular displacement goes above a predetermined value, and an uninterrupted alternating voltage appears across terminals E and F in the condition where the angular displacement deviates from the position of alignment in one direction while no alternating voltage appears when the deviation is in the opposite direction. These three alternating voltages, as will be demonstrated in Fig. 3, act to control the power supply systems 22 and 25 for energizing motor 19 in accordance with the phase and amplitude of the error signal.

Referring now to Figure 3, terminals A' to F' are for connection to terminals A to F, respectively, in Figure 2. Terminals A' to D' are associated with full-wave rectifying supply 25 including gaseous discharge tubes 26 and 27, while terminals E' and F' are associated with alternately operating half-wave rectifying supply 22 which includes gaseous discharge devices 23 and 24.

Supply 25 further includes a power transformer 110 having a primary winding connected to alternating-current source 18 and a center-tapped secondary winding connected between the anodes of tubes 26 and 27. The cathodes of tubes 26 and 27 are interconnected and in addition are connected through bias battery 111 to both terminals B' and D'. The grid of tube 26 is connected through resistor 112 to terminal A', while the grid of tube 27 is connected via resistor 113 to terminal D'. The armature 20 of motor 19 is connected between the centertap in the secondary of transformer 110 and the cathodes of tubes 26 and 27. Shunted across armature 20 is a damping resistor 114.

Tubes 26 and 27 are arranged in a full-wave rectifier circuit, both tubes normally being biased to cutoff by battery 111. In operation, when alternating voltage pulses appear at terminals A' and B' with a repetition rate in accordance with the angular displacement of the input and output shafts, the bias is overcome and tube 26 is rendered periodically conductive in synchronism with the pulsing. It is to be noted that the alternating voltage on the grid is applied in phase with the alternating voltage on the anode to effect excitation. Half-wave voltage pulses are supplied by tube 26 to armature 20 to energize the motor. When the angular displacement exceeds the predetermined value an uninterrupted alternating voltage appears at terminals C' and D' and is impressed on the grid of tube 27, whereby a half-wave rectified voltage is applied to armature 20 in addition to the half-wave voltage pulses supplied by tube 26. Thus the voltage established across armature 20 when the angular displacement exceeds the predetermined value is full-wave rectified during the existence of pulses at terminals A' and B' and half-wave rectified intermediate the occurence of the pulses.

Supply 22 further includes a transformer 115 whose primary is connected to alternating-current source 18 and whose secondary is connected at one end through choke 116 and resistor 117 to the anode of tube 24, and at the other end through choke 118 to the cathode of tube 24. The anode of tube 23 is connected through resistor 119 to the cathode of tube 24, while the cathode of tube 23 is connected to the junction of resistor 117 and choke 116. The anode of tube 23 is also connected through series connected resistors 120 and 121 to the grid of tube 24 and connected between the junction of resistors 120 and 121 and the cathode of tube 24 is a filter condenser 122. The cathode of tube 23 is connected via bias battery 123 to terminal F', while the grid of tube 23 is connected via resistor 124 to terminal E'. Shunted across field 21 is a damping resistor 140. Chokes 116 and 118 function to prevent oscillation in the power supply.

Resistors 114 and 140 serve the important function of rendering direct current motor 19 adequately responsive to the output of the tubes 23 and 24 as well as tubes 26 and 27 all of which are of the gas discharge or thyratron type. Such output has a large alternating output component which ordinarily produces a considerable reactance in the motor winding such as field winding 21 and impedes satisfactory operation of the motor. This problem has been met by the application of resistors 114 and 140 across the respective windings. Such resistors are selected to have approximately the same impedance as the motor windings and they produce regularity and smoothness in the motor operation by lowering sufficiently the impedance of the windings.

It will be seen that tubes 23 and 24 are effectively connected in parallel opposition and in series with field 21 across the secondary of transformer 15. No bias is normally applied to the grid of tube 24 so that this tube initially supplies a half-wave rectified voltage to field 21, causing the motor to turn in one direction. Tube 23, however, is normally biased to cut-off by means of battery 123. When an alternating voltage appears at terminals E' and F', the bias on tube 23 is overcome causing a half-wave rectified voltage to be developed across resistor 119 which is filtered by condenser 122 and applied through resistor 121 to the grid of tube 24 to render same inoperative. The half-wave rectifier voltage across resistor 119 is also applied across field 21 but with a polarity opposing that provided by tube 24. As a result, the motor reverses in direction.

It will be apparent that the voltage applied to field 21 instantly reverses in polarity as the phase of the error signal reverses and at no time is the field de-energized. In this way a dynamic braking action of motor 19 is effected.

Maximum peak power is supplied to armature 20 when both the holdover circuits and pulse circuits are in operation in the condition where the angular displacement exceeds the predetermined value. In this condition motor 20 rotates at its maximum speed. When the holdover circuit is thereafter disabled, power is supplied only by the pulsing circuit, thereby causing an abrupt drop in peak power and reduced motor speed. The peak power then remains at a constant level for any angular displacement between zero value and the predetermined value, but the speed of motor 20 is reduced by applying the power intermittently to armature 20. Hence, as pointed out above, the torque is maintained at a high level even for small values of angular displacement.

In the rotation of radar antenna mount 15 by means of the servo mechanism, the antenna may be caused to assume any desired position by adjusting handwheel 14 to produce an error signal. Obviously, however, the invention is not limited to this particular use. For example, the error signal may be derived from an automatic tracking radar system whereby the servo mechanism follows an error signal to maintain the antenna oriented with respect to a target. If, on the other hand, continuous scanning is desired, a fixed voltage is applied to multivibrator 32 by means of switch 52, and the output octupler rectifier 32 is disconnected therefrom so that pulses at a definite rate are applied to armature 20 and the motor rotates at a uniform speed.

The servo system may also be adapted to perform sector scanning whereby the antenna mount moves back and forth through a limited angle, as contrasted to continuous 360 degree rotation. As shown separately in Figure 4, sector scanning may be accomplished by deriving from the half-wave rectified direct voltage appearing across field 21 a reversible phase alternating voltage whose phase depends on the polarity of the direct voltage. To this end there is provided a transformer 125 whose primary winding is shunted across field 21 and whose secondary winding is shunted across a condenser 126. Condenser 126 acts to reshape the voltage across the secondary of transformer 125 so as to produce a sinusoidal alternating voltage whose phase is determined by the polarity of the primary voltage. The alternating voltage thus produced is supplied to the rotor 127 of a conventional synchro generator 128 having delta arranged stators 129. The junctions of stators 129 are connected to the corresponding junctions of delta-arranged stators 130 of a conventional synchro control transformer 131 having a rotor 132.

Rotor 127 is locked permanently into position at a predetermined angular setting while rotor 132 is adjustable and is set to a predetermined angular position displaced from that of rotor 127 to an extent equal to the angle of the desired sector. Input shaft 10 in the servo system is set at the same position as that of rotor 127, so that the rotors of synchro generators 16 and 128 are in alignment. Thus rotors 127 and 132 define the limits of the sector to be scanned and by adjusting the relative angular positions of the rotors the sector angle may likewise be adjusted. The phase of the alternating current applied to rotor 127 is determined by the polarity of the half-wave rectified voltage across field 21 and the phase will reverse as the polarity reverses. Inasmuch as a fixed angular displacement exists between the rotors 127 and 132 an error signal will always be produced, said signal being applied to terminals 133. This error signal is fed to input terminals 40 of the controller in combination with error signal from control transformer 17 so that the signal now appearing in the controller is the resultant of the respective error signals of control transformers 17 and 131. This may be effected by either a series or parallel connections of the transformer rotors, the former being preferable where a relatively high impedance is desired.

In operation, as the antenna rotates in a direction extending from the angular position corresponding with that of rotor 127 to that of rotor 132, the error signal developed in rotor 132 will be in one phase. When the antenna arrives at the position corresponding to that of rotor 132, the phase of the alternating-current applied to rotor 127 reverses and the antenna now moves in the opposite direction towards the position corresponding with that of rotor 127, at which point a reversal again occurs and the antenna action is repeated. At the angular antenna position corresponding to that of rotor 127, transformer 17 produces no error signal, hence at that instant a reversal occurs in the phase of alternating-current applied to rotor 127. At the angular antenna position corresponding to that of rotor 132, the respective error signals are of equal amplitude but of opposite phase, hence no resultant signal is produced and a reversal in the phase of alternating current applied to rotor 127 is again brought about. Thus by the addition of the synchro system in Figure 4, the servo system is capable of automatically performing sector scanning. It is to be noted that to secure uniform motor speed in the course of sector scanning, a fixed voltage is applied to multivibrator 32 and octupler rectifier 31 is disconnected.

As pointed out in the foregoing, an important feature of the invention resides in the fact that the average power supplied to the motor is varied in accordance with the angular displacement, but the peak power and therefore the motor torque is maintained at a constant level. In the embodiment above disclosed this action is accomplished by supplying successive power pulses to the motor, said pulses having a constant amplitude and a fixed width but a varying periodicity.

In another embodiment of the invention, the same feature is provided by maintaining the periodicity constant but by varying the width of the pulses in accordance with the angular displacement. In this case the same result is attained since the average power again will vary but the peak power will remain constant. Of course, the minimum duration of the pulses must be such as to provide sufficient power to operate the motor efficiently.

It will be evident that, excepting for multivibrator 32, this embodiment may be identical in structure with that shown in Figure 1. Pulse duration modulation in accordance with the varying uni-polarity voltage from octupler rectifier 31 may be effected in a conventional manner, as shown in Figure 5, by producing a periodic sawtooth voltage by means of generator 134 and combining the sawtooth voltage with the output of octupler rectifier 31 in a modulator 135. The resultant wave is fed to a clipper circuit 136 whose output is constituted by substantially rectangular pulses of varying duration, the duration of each pulse depending on the instantaneous magnitude of the uni-polarity voltage applied to modulator 135. As shown by wave pattern 136', the solid line section of the sawtooth represents the actual output of the clipper 136 and the dashed line section represents the clipped portion of the sawtooth. Since the amplitude of the sawtooth applied to clipper 136 varies in accordance with the voltage from octupler 31, the clipping action converts the amplitude variation of each sawtooth pulse into one of width.

While there has been shown what at present are considered preferred embodiments of the invention, it is obvious that many changes and modifications may be made without departing from the essential aspects of the inventions. For example, although the power sources for the motor 19 in the above embodiment are shown as electronically controlled in accordance with the error signal, the same control functions may, if preferred, be effected by electromechanical means such as relays responsive to voltage pulses. It is intended therefore in the annexed claims to cover all such changes and modifications as fall within the true spirit and scope of the invention.

What is claimed is:

1. In a servo system for rotating an output shaft in correspondence with an arbitrary motion of an input shaft, the combination comprising means to generate a reversible-phase error signal whose amplitude varies in accordance with the angular displacement between said input and output shafts and whose phase depends on the direction of said displacement, drive means for rotating said output shaft, means including a multivibrator, a pulse modulator fed thereby and a half-wave rectifier responsive to said error signal for periodically energizing said drive means at a rate in accordance with the amplitude of said signal, and means responsive to said error signal for controlling the direction of rotation of said drive means in accordance with the phase of said signal.

2. In a servo system for rotating an output shaft in correspondence with an arbitrary motion of an input shaft, the combination comprising means to generate a reversible-phase error signal whose amplitude varies in accordance with the angular displacement between said input and output shafts and whose phase depends on the direction of said displacement, drive means for rotating said output shaft, means including a multivibrator and a half-wave rectifier responsive to said error signal for periodically energizing said drive means at a rate in accordance with the amplitude of said signal, means responsive to said error signal for continuously energizing said drive means when the amplitude of said signal corresponds to an angular displacement exceeding a predetermined value, and means responsive to said error signal for controlling the direction of rotation of said drive means in accordance with the phase of said signal.

3. In a servo system for rotating an output shaft in correspondence with an arbitrary motion of an input shaft, the combination comprising means to generate a reversible-phase error signal whose amplitude varies in accordance with the angular displacement between said input and output shaft and whose phase depends on the direction of said displacement, a direct-current motor having an armature and a field, said motor being arranged to drive said output shaft, means including a multivibrator and a pulse modulator fed thereby, both being jointly responsive to said error signal to apply successive direct-current voltage pulses across said armature at a rate in accordance with the amplitude of said signal, means responsive to said error signal to apply an uninterrupted direct-current voltage across said armature when the amplitude of said signal corresponds to an angular displacement exceeding a predetermined value, and means responsive to said error signal to apply a direct-current voltage across said field with a polarity in accordance with the phase of said signal.

4. In a servo system for rotating an output shaft in correspondence with an arbitrary motion of an input shaft, the combination comprising means to generate a reversible-phase error signal whose amplitude varies in accordance with the angular displacement between said input and output shafts and whose phase depends on the direction of said displacement, a direct-current motor having an armature and a field, said motor being coupled to drive said output shaft, a first direct-current source connected to said armature, a second direct-current source connected to said armature in the same polarity as said first source, said first and second sources being normally disabled, means responsive to said error signal to render said first source periodically operative at a rate in accordance with the amplitude of said signal, means responsive to said error signal to render said second source continuously operative when the amplitude of said signal corresponds to an angular displacement exceeding a predetermined value, a third direct-current source connected to said field, a fourth direct-current source connected to said field in a polarity opposing said third source, said third source being normally disabled and said fourth source being normally operative, and means responsive to one phase condition of said error signal to render simultaneously said third source operative and said fourth source inoperative.

5. An arrangement, as set forth in claim 4, wherein said first and second sources are defined by the respective half-wave sections of a full-wave, alternating-current rectifying power supply.

6. An arrangement, as set forth in claim 4, wherein said third and fourth sources are defined by a pair of half-wave alternating-current rectifiers arranged in parallel opposition with respect to said field, one of said rectifiers being normally disabled and the other of said rectifiers being normally operative, the direct voltage developed by said one rectifier upon being rendered operative in response to one phase condition of said error signal being applied to said other rectifier to render same inoperative.

7. A servo system for rotating an output shaft in correspondence with an arbitrary motion of an input shaft comprising an error detector coupled to said input and output shafts for producing a reversible-phase error signal whose amplitude varies in accordance with the angular displacement of said shafts and whose phase depends on the direction of said displacement, a direct-current motor having an armature and a field, said motor being arranged to drive said output shaft, a source of alternating-current, a full-wave rectifying system connected to said source and including a pair of grid-controlled discharge devices and means normally to bias said devices to cut-off, the output of said full-wave system being connected to said armature, means responsive to said error signal to produce a uni-polarity potential proportional to the amplitude thereof, means to generate successive voltage pulses at a repetition rate in accordance with the magnitude of said uni-polarity potential, a pulse modulator, means to apply said pulses and an alternating-current from said source as an input to said modulator to produce alternating-current output pulses, means to apply said alternating-current output pulses to the grid of one of said devices in said full-wave system to render said device operative, a threshold circuit arranged upon activation to apply alternating-current from said source to the grid of the other of said devices in said full-wave system, means to rectify said error signal to provide a uni-polarity direct voltage proportional to the amplitude thereof, means to apply said uni-polarity direct voltage as an input to said threshold circuit, the limit of said threshold circuit being set to the point at which any magnitude of the applied uni-polarity direct voltage exceeding the magnitude corresponding to a predetermined value of angular displacement actuates said threshold circuit and renders said other device in said full-wave system operative, first and second half-wave alternating-current rectifying supplies connected in parallel opposition across the field of said motor, each of said half-wave supplies having a grid-controlled discharge tube, said first supply being normally inoperative and said second supply being normally operative to produce a direct voltage across said field of one polarity, means to produce a reversible-polarity direct voltage depending on the phase of said error signal inverter, means responsive solely to one polarity of said reversible-polarity direct voltage to apply an alternating-current from said source to the grid of the tube in said first supply for rendering same operative to produce a direct voltage across said field of the opposite polarity, and means to apply said direct voltage of said first supply as a bias on the grid of the tube in said second supply to render same inoperative.

8. An arrangement, as set forth in claim 7, wherein said means responsive to said error signal to produce a uni-polarity potential proportional to the amplitude thereof includes an octupler rectifier system provided with four duo-diode tubes connected in series, the anode of each diode being connected to the cathode of the succeeding diode, said error signal being applied to said four duo-diode to effect octupler rectification, and four filter capacitors connected in series, the junctions of said series connected capacitors being connected to the corresponding junctions of said series connected duo-diodes, said filter capacitors having values at which the regulation of said system is such whereby the uni-polarity voltage developed across said capacitors varies according to the amplitude of said signal.

9. An arrangement, as set forth in claim 7, wherein said means to generate successive voltage pulses at a repetition rate in accordance with the magnitude of said uni-polarity potential includes a free-running multivibrator pulse generating system provided with a pair of electron discharge tubes each having a cathode, a grid and an anode, the grid of each tube being capacitatively coupled to the anode of the other tubes, means to apply a bias to the cathode of one of said tubes normally to maintain said multivibrator system just below the point of free running operation, and means to apply said uni-polarity potential simultaneously to the grids of both tubes whereby said bias is overcome and said system operates at a rate in accordance with the magnitude of said potential.

10. An arrangement, as set forth in claim 7, wherein said threshold circuit comprises an electron discharge tube having a cathode, a first grid, a second grid and an anode and circuits therefor, an output impedance connected in the anode-cathode circuit of said tube, means to apply an alternating current from said source to said second grid, means to apply a fixed bias to said first grid to maintain said tube normally inoperative at a predetermined limit, and means to apply said uni-polarity voltage to said first grid, said limit be set at the point at which any magnitude of the uni-polarity voltage exceeding the magnitude corresponding to a predetermined value of angular displacement rises above said limit to activate said threshold circuit, whereby an alternating current component is developed across said output impedance.

11. An arrangement, as set forth in claim 7, wherein said first and second alternating-current rectifying supplies connected in parallel opposition comprises first and second grid-controlled gaseous discharge tubes, a power transformer having a primary connected to said source and a secondary connected in series with the field of said motor across said second discharge tube, a resistance element, means connecting said first tube in series with said element in parallel opposition to said second tube, means to impress a bias voltage on the grid of said first tube to maintain said tube normally inoperative, means to apply the alternating-current output from said inverter means on the grid of said first tube to render same operative, means to filter the direct voltage developed across said element, and means to impress said direct voltage on the grid of said second tube to render same inoperative.

12. An arrangement, as set forth in claim 7, wherein said means to produce a reversible-polarity direct voltage depending on the phase of said error signal comprises a phase-sensitive rectifier having a pair of electron discharge tubes each provided with a cathode, a grid on an anode, an output circuit interconnecting the anodes of said tubes, means to apply error signal in push-pull relation to the grids of said tubes, and means to apply alternating-current from said source in parallel relation to the grids of said tubes.

13. A radar system provided with a servo mechanism having an input shaft and an output shaft coupled to a rotatable antenna, said mechanism being arranged to rotate said antenna back and forth throughout a limited sector and comprising a first error detector including a synchro transformer having a rotor coupled for angular movement with said output shaft and a stator and a synchro generator having a rotor coupled for movement with said input shaft and a stator connected to the stator of said transformer, said generator rotor being energized from an alternating-current source whereby said transformer rotor yields a first reversible-phase error signal in accordance with the angular displacement between said input and output shafts, a direct-current motor for driving said output shaft and including an armature and a field, means responsive to said error signal to apply successive direct-current pulses across said armature at a rate in accordance with the amplitude of said first error signal, means responsive to said first error signal to apply a half-wave rectified direct-current voltage across said field with a polarity depending on the phase of said signal, a second error detector including a synchro generator having a rotor and a stator and a synchro transformer having a rotor and a stator coupled to the stator of said generator, means to derive from the half-wave rectified voltage across the field of said motor an alternating-current for energizing the rotor of said generator in said second detector whereby the transformer rotor thereof yields a second reversible-phase error signal, and means to superimpose said second signal on said first signal, the rotors of the generator and transformer in said second detector being set at angular positions having a predetermined displacement equal to the extent of the desired sector, the transformer rotor of said first detector being set at an angular position corresponding to one of the rotors in said second detector.

14. In a servo system for rotating an output shaft in correspondence with an arbitrary motion of an input shaft, the combination comprising means to generate an error signal whose amplitude varies in accordance with the angular displacement between said input and output shafts, drive means for rotating said output shaft, a power source for said drive means, and means responsive to said error signal to apply power pulses from said source to said drive means periodically at a constant rate, the duration of said pulses being varied in accordance with the amplitude of said error signal, said means to apply pulses of constant periodicity whose duration varies in accordance with said error signal including a generator for producing periodic sawtooth voltages at a constant rate, means to derive a uni-polarity voltage proportional to the amplitude of said error signal, means to combine said sawtooth and uni-polarity voltages, and means to clip the combined voltages at a level producing pulses of constant amplitude and periodicity whose duration varies in accordance with said uni-polarity voltage.

JOHN J. ROOT.

REFERENCES CITED

The following references are of record in the file of this patent:

UNITED STATES PATENTS

| Number | Name | Date |
| --- | --- | --- |
| 746,047 | Dodge | Dec. 8, 1903 |
| 1,743,545 | Helpbringer | Jan. 14, 1930 |
| 2,109,776 | Johnson | Mar. 1, 1938 |
| 2,371,415 | Tolson | Mar. 13, 1945 |
| 2,399,695 | Satterlee | May 7, 1946 |
| 2,435,965 | Hartig | Feb. 17, 1948 |
| 2,435,966 | Isserstedt | Feb. 17, 1948 |
| 2,443,639 | Potter | June 22, 1948 |
| 2,459,039 | Mesa | Jan. 11, 1949 |
| 2,460,638 | Gilbert | Feb. 1, 1949 |